United States Patent [19]

Iwatani

[11] 4,372,223
[45] Feb. 8, 1983

[54] MOVING TABLE ASSEMBLY

[75] Inventor: Nobuo Iwatani, Fujisawa, Japan

[73] Assignee: Nippon Seiko Kabushiki Kaisha, Tokyo, Japan

[21] Appl. No.: 216,259

[22] Filed: Dec. 15, 1980

[30] Foreign Application Priority Data

Dec. 20, 1979 [JP] Japan .......................... 54-175621[U]
Feb. 6, 1980 [JP] Japan .............................. 55-12899[U]

[51] Int. Cl.³ ........................ A47B 1/00; F16M 11/04
[52] U.S. Cl. ..................................... 108/143; 33/1 M;
108/20; 248/178; 248/429; 269/60; 74/89.15
[58] Field of Search .................. 108/20, 21, 137, 143;
248/178, 179, 424, 429, 430; 269/60, 73; 33/1
M, 174 TA; 350/86, 90

[56] References Cited

U.S. PATENT DOCUMENTS

| | | | |
|---|---|---|---|
| 3,638,933 | 2/1973 | Burnette et al. ................. | 108/137 X |
| 3,745,840 | 7/1973 | Guralnick .......................... | 74/89.15 |
| 4,013,280 | 3/1977 | Chitayat et al. .................... | 269/60 |
| 4,113,223 | 9/1978 | Kakizaki .......................... | 108/143 X |
| 4,266,437 | 5/1981 | Obergfell ....................... | 74/89.15 X |

Primary Examiner—William E. Lyddane
Attorney, Agent, or Firm—Wyatt, Gerber, Shoup, Scobey & Badie

[57] ABSTRACT

A moving table assembly has a base, a table supported by the base for movement in one direction, a feed screw having its axis parallel to the direction of movement of the table, a nut threadably engaged with the feed screw, and a connecting mechanism for connecting the table and the nut, the connecting mechanism comprising a first connecting portion for transmitting the axial displacement of the nut to the table and a second connecting portion for preventing the nut from rotating relative to the axis of the feed screw, the first connecting portion being provided with a guide member having a pair of guide surfaces provided on one of the table and the nut in orthogonal relationship with the axis of the feed screw, two support shafts corresponding to the guide surfaces respectively and secured to the other of the table and the nut, and two arms rockably provided on the support shafts respectively and having at the opposite ends thereof rotatable rollers engaging the guide surfaces, the rollers being pressed against the guide surfaces by resilient deformation of the arms.

5 Claims, 9 Drawing Figures

MOVING TABLE ASSEMBLY

BACKGROUND OF THE INVENTION

1. Field of the Invention

This invention relates to a moving table assembly disposed between a table supported by a base for movement in one direction and a nut threadably engaged with a feed screw supported by the base with the axis thereof parallel to the direction of movement of the table so that there is obtained accurate displacement of the table corresponding to the rotative displacement of the feed screw.

2. Description of the Prior Art

The conventional positioning table assembly generally used is of a construction in which a nut is secured to a table guided and supported by guide means provided on a base and movable in one direction and a feed screw is threadably engaged with the nut so that there is obtained a displacement of the table corresponding to the rotative displacement of the feed screw.

Such a positioning moving table assembly has an advantage that its mechanism is simple, whereas some eccentricity resulting from an error of finishing is present in the feed screw or the bearing portion for rotatably supporting the feed screw and therefore, when the feed screw is rotated, the nut is displaced in the axial direction of the feed screw and in addition, is slightly deviated in a direction perpendicular to the axis of the feed screw. In a positioning table requiring precision, a ball screw is generally used as the feed screw and balls interposed between the feed screw and the nut are pre-pressed or pre-loaded to eliminate any back-lash of the feed screw and the nut and therefore, if there is a deviation of the nut as described above, such deviation of the nut is transmitted to the table, and with the rotation of the feed screw, a force in a compression or pull direction acts on the guide means supporting the table and thus, the sliding resistance of the sliding portion of the guide means fluctuates so that accurate sliding movement of the table cannot be effected.

SUMMARY OF THE INVENTION

The present invention has been made in view of the above-noted disadvantage and an object thereof is to provide a moving table assembly in which even if there is some eccentricity of the feed screw or the like, the operation characteristic of the table is not hampered and accurate positioning is obtained and which has a durable connecting mechanism for the table and the nut.

To achieve such object, according to the present invention, a pair of guide surfaces orthogonal to the axis of the feed screw are provided on one of the table and the nut, an arm having at the opposite ends thereof rollers engaging the guide surfaces is rockably mounted on the other of the table and the nut, and provision is made of a connecting mechanism having a first connecting portion for pre-pressing or pre-loading the two rollers against the guide surfaces, respectively, by resilient deformation of the arm and transmitting the axial displacement of the nut to the table, and a second connecting portion for preventing the nut from rotating relative to the axis of the feed screw, the second connecting portion having an engaging surface parallel to the axis of the feed screw and provided on one of the table and the nut and a pin provided on the other of the table and the nut and engaging the engaging surface by being pre-pressed thereagainst, whereby accurate displacement of the table corresponding to the rotation of the feed screw may be obtained.

The present invention of such construction is applicable to a lower table supported on the base for movement in one direction, and an XY moving carriage placed on the lower table for movement in a direction perpendicular to the direction of movement of the lower table. The XY moving carriage is generally of a construction in which a feed screw for moving the lower table is supported on the base and a feed screw for moving the upper table is supported on the lower table, but due to the fact that a motor or the like which is a drive source for driving the upper table is mounted on the lower table, the XY moving carriage of such type has a disadvantage that the weight of the lower table is great and the inertia of the lower table is great, as a result of which it is difficult to move the lower table at a high speed. Also, the XY moving carriage in which the motor is mounted on the lower table has a disadvantage that the vibration generated by the motor causes vibration of the table and even if the motor is stopped, the table does not immediately become stabilized.

As an XY moving carriage which has eliminated such disadvantages, there is known an XY moving carriage in which the feed screw for moving the upper table is supported on the base and a pair of guide rollers are provided on a sliding block threadably engaged with this feed screw and one end of the upper table in its direction of movement is bent and held between the guide rollers. However, this XY moving carriage, which uses a sliding block, has suffered from a disadvantage that if there is eccentricity of the feed screw or the portion supporting the feed screw, deviation of the nut is caused and the surface pressure imparted to the sliding surface of the sliding block is varied, so that the sliding resistance of the sliding block is varied to make accurate positioning of the table difficult.

In view of the above-noted disadvantage peculiar to the conventional XY moving carriage, it is a second object of the present invention to provide an XY moving carriage which enables high-speed operation of the table and also enables accurate positioning of the table even if there is some eccentricity of the feed screw or the portion supporting the feed screw.

To achieve such object, according to the present invention, a feed screw for moving the upper table is supported on a base, a pair of guide surfaces orthogonal to the axis of the feed screw are provided on one of the nut and the upper table, a first connecting portion is provided which has an arm having at the opposite ends thereof rollers engaging the guide surfaces, the arm being rockably mounted on the other of the nut and the upper table, a pair of guide surfaces parallel to the axis of the feed screw are provided on one of the nut and the base, a second connecting portion is provided which has an arm having at the opposite ends thereof rollers engaging the guide surfaces, the arm being rockably mounted on the other of the nut and the base, and the two rollers are prepressed against the respective guide surfaces by resilient deformation of the respective arms to thereby enable accurate positioning of the upper table corresponding to the rotation of the feed screw.

Other objects and features of the present invention will become apparent from the following detailed description taken in conjunction with the accompanying drawings.

DESCRIPTION OF THE PREFERRED EMBODIMENTS

Figure 1:
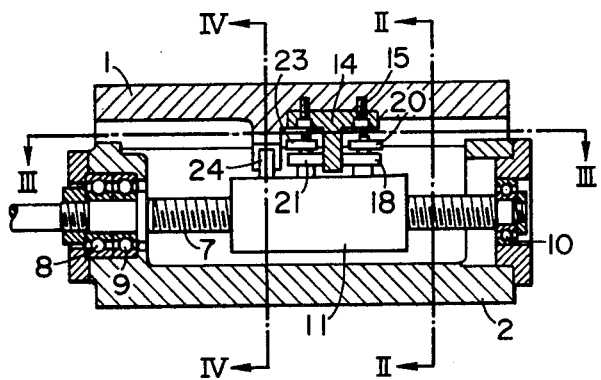
FIG. 1 is a longitudinal cross-sectional view of the positioning moving table assembly according to a first embodiment of the present invention.
Figure 2:
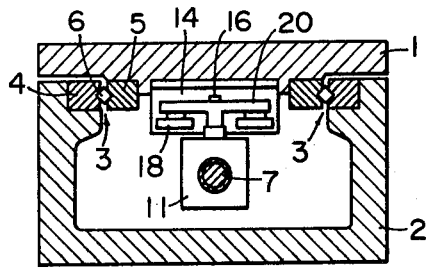
FIG. 2 is a cross-sectional view taken along line II—II of FIG. 1.
Figure 3:
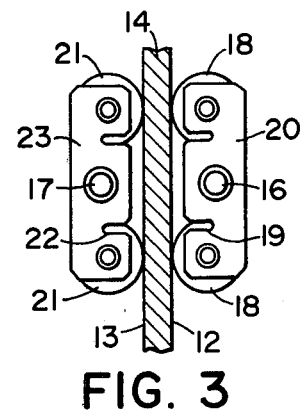
FIG. 3 is a fragmentary cross-sectional view taken along line III—III of FIG. 1.
Figure 4:
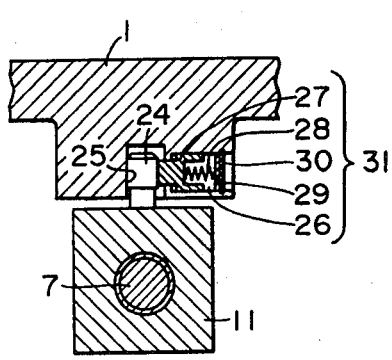
FIG. 4 is a cross-sectional view taken along line IV—IV of FIG. 1.

A first embodiment of the present invention will hereinafter be described by reference to FIGS. 1 to 5.

A table 1 is supported by two sets of guide means 3 provided on a base 2 and is movable in one direction. As the guide means 3, use is made of a cross roller direct-acting guide comprising rollers 6 having the directions of their axes alternately changed at right angles between two guide blocks 4 and 5, but the guide means 3 may also be other form of guide means.

A feed screw 7 has its axis parallel to the direction of movement of the table 1 and is rotatable supported on the base 2 by fore and aft bearings 8, 9 and 10.

A nut 11 is threadably engaged with the feed screw 7 and is movable in the axial direction of the feed screw 7 by the rotation of the feed screw 7.

Provided between the table 1 and the nut 11 is a connecting mechanism for positively transmitting the displacement of the nut 11 to the table 1.

This connecting mechanism comprises a first connecting portion for transmitting the axial displacement of the nut 11 to the table 1, and a second connecting portion for preventing the nut 11 from rotating relative to the feed screw 7.

A rail 14 having parallel guide surfaces 12 and 13 is secured to the table 1 by bolts 15, and the guide surfaces 12 and 13 are orthogonal to the axis of the feed screw 7.

Support shafts 16 and 17 corresponding to the guide surfaces 12 and 13 respectively and spaced apart in the direction of the axis of the feed screw 7 are secured to the nut 11. Rockably fitted to the support shaft 16 is an arm 20 having at the opposite ends thereof rotatable rollers 18 engaging the guide surface 13 and provided with cut-aways 19, and rockably fitted to the support shaft 17 is an arm 23 having at the opposite ends thereof rotatable rollers 21 engaging the guide surface 13 and provided with cut-aways 22.

The distance between the center of the support shaft 16 and the center of the support shaft 17, minus the distance in free condition from the center of the support shaft 16 to the common tangent of the two rollers 18 at that side on which the rollers 18 contact the guide surface 12 and the distance in free condition from the center of the support shaft 17 to the common tangent of the two rollers 21 at that side on which the rollers 21 contact the guide surface 13, is chosen to a value smaller than the width dimension between the guide surfaces 12 and 13 of the rail 14 and therefore, the rail 14 is assembled between the rollers 18 and 21 by resiliently deforming the arms 20 and 23 and enlarging the spacing between the opposed rollers 18 and 21.

The rollers 18 and 21 are always in engagement with the guide surfaces 12 and 13 in pre-pressed or pre-loaded condition by the resilient deformation of the arms 20 and 23 having cut-aways 19 and 22.

The arms 20 and 23 are provided with cut-aways 19 and 22 for causing the rollers 18 and 21 to engage the guide surfaces 12 and 13 with a suitable pre-pressure, but such cut-aways may be replaced by any other means capable of providing suitable resiliency.

Figure 5:
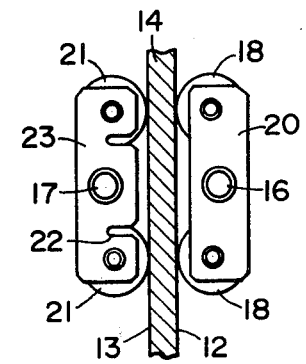
FIG. 5 is a view showing a modification and corresponding to FIG. 3.
Figure 6:
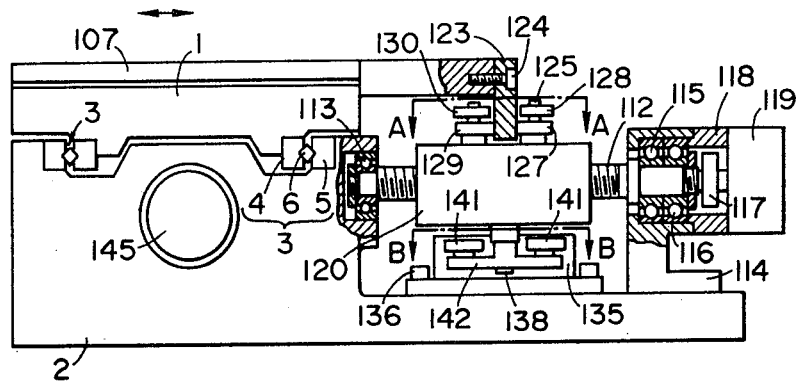
FIG. 6 is a front view of an XY moving carriage which is a second embodiment of the present invention.
Figure 7:
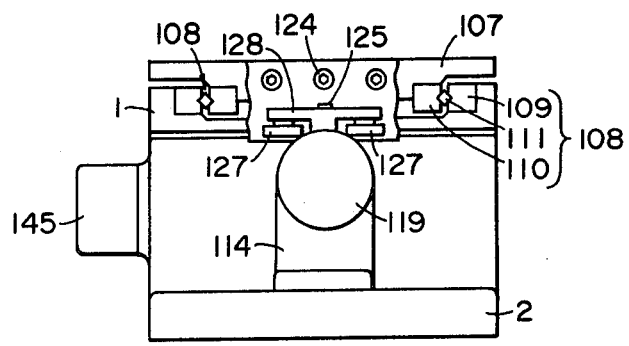
FIG. 7 is a right-hand side view of the carriage shown in FIG. 6.
Figure 8:
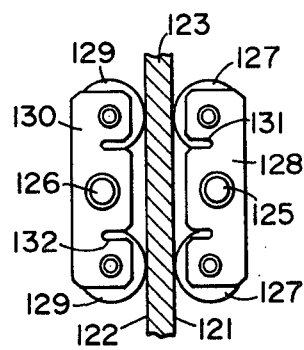
FIG. 8 is a cross-sectional view taken along line A—A of FIG. 6.
Figure 9:
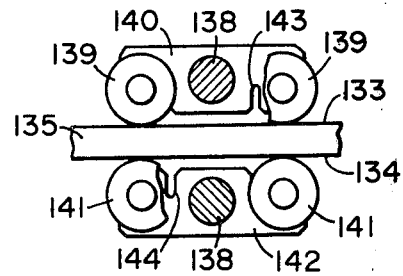
FIG. 9 is a cross-sectional view taken along line B—B of FIG. 6.

FIG. 5 shows another embodiment in which cut-aways 22 are provided only in the arm 23 and a difference in rigidity is provided between the left and right arms.

With the above-described construction, the table 1 and the nut 11 are in a connection having no back-lash in the axial direction of the feed screw 7, and the table 1 and the nut 11 are freely movable in a direction perpendicular to the axial direction by the rollers 18 and 21 rolling on the guide surfaces 12 and 13 and therefore, there is formed a first connecting portion through which the displacement of the nut in a direction perpendicular to the axial direction is not transmitted to the table 1.

Also, a pin 24 is secured to the nut 11 at a position spaced apart from the first connecting portion, and the table 1 is provided with an engaging surface 25 engaging the pin 24 and parallel to the axis of the feed screw.

The table 1 is provided with a cylinder 26 at a position opposed to the engaging surface 25. A piston 27 is loosely fitted in the cylinder 26 and is biased toward the engaging surface 25 by a spring 28. That side of the spring 28 which is opposite to the side thereof which contacts the piston 27 is supported by a receiving plate 29 which is fixed by a snap ring 30 fitted in a groove provided in the cylinder 26, thereby forming pressing means 31.

The pin 24 engaged with the engaging surface 25 is pressed or loaded from the side opposite to the engaging surface 25 by the biased piston 27 and is pre-pressed against the engaging surface 25, thus constituting a second connecting portion in which the nut 11 is prevented from rotating relative to the feed screw 7.

In this embodiment, the pin 24 is shown as being cylindrically shaped and integral with the nut 11, whereas a needle bearing may also be interposed therebetween. Also, a hydraulic pressure may be utilized for the pressing means 31 of the pin 24.

The connecting mechanism of the present invention constructed as described above is provided with the first connecting portion for transmitting only the axial displacement of the nut to the table and the second connecting portion for preventing the nut from rotating relative to the feed screw, and the displacement of the nut by the rotation of the feed screw can be absorbed and therefore, even if there is some eccentricity of the feed screw or the bearing portion or the like which rotatable supports the feed screw, the sliding movement resistance of the guide means supporting the table is not greatly varied and an accurate operation of the table corresponding to the rotation of the feed screw is obtained to enable accurate positioning of the table to be accomplished.

Further, in a connecting mechanism having a first connecting portion in which one of the arms is provided with cut-aways so that a desired pre-pressure is provided by resilient deformation of this arm, that side which is not provided with cut-aways provides a standard and accuracy of the parts on that side which is provided with cut-aways may be made somewhat loose, thus making the manufacture easy.

This embodiment has been shown as having the first connecting portion in which the guide surfaces 12 and 13 are provided on the table 1 side and the support shafts 16 and 17 are provided on the nut 11 side, and the second connecting portion in which the engaging surface 25 is provided on the table 1 side and the pin 24 is provided on the nut 11 side, but alternatively, the first connecting portion may be made into a construction in which the support shafts 16 and 17 are provided on the table 1 side and the guide surfaces 12 and 13 are provided on the nut 11 side, and the second connecting portion may be made into a construction in which the pin 24 is provided on the table 1 side and the engaging surface 25 is provided on the nut 11 side, whereby there may be obtained a similar operational effect.

Reference is now made to FIGS. 6 to 9 to describe a second embodiment of the present invention.

In the second embodiment, a lower table 1 corresponding to the table 1 in the first embodiment is supported by a first guide means 3 provided on a base 2 and is movable in one direction. As the first guide means 3, use is made of a cross roller direct-acting guide comprising rollers 6 having the directions of their axes alternately changed at right angles between two guide blocks 4 and 5, but the first guide means 3 may also be other form of guide means. The mechanism between the lower table 1 and the base 2 is of the same construction as that in the first embodiment shown in FIGS. 1 to 5 and therefore need not be described.

An upper table 107 is supported by two sets of second guide means 108 provided on the lower table 1 and is movable in a direction perpendicular to the direction of movement of the lower table 1. As the second guide means 108, use is made of a cross roller direct-acting guide comprising rollers 111 having the directions of their axes alternately changed at right angles between two guide blocks 109 and 110, but the second guide means 108 may also be other form of guide means.

A feed screw 112 has its axis parallel to the direction of movement of the upper table 107 and is rotatably supported by a bearing 113 and two bearings 115, 116 fitted to a bracket 114. A coupling 117 is mounted on one end of the feed screw 112, and the shaft of a motor 119 mounted on the bracket 114 through an intervening seat 118 is coupled to the feed screw 112 by the coupling 117.

A nut 120 is threadably engaged with the feed screw 112 and is movable in the axial direction of the feed screw 112 by the rotation of the feed screw 112.

A first connecting portion for positively transmitting the displacement of the nut 120 to the upper table 107 is provided between the upper table 107 and the nut 120, and a second connecting portion for preventing the nut 120 from rotating relative to the feed screw 12 is provided between the nut 120 and the base 2.

The first connecting portion is constituted by securing a rail 123 having guide surfaces 121, 122 perpendicular to the direction of movement of the upper table 107 by means of bolts 124 so that the rail 123 is orthogonal to the axis of the feed screw 112, securing to the upper surface of the nut 120 support shafts 125 and 126 corresponding to the guide surfaces 121 and 122 respectively and spaced apart in the direction of the axis of the feed screw 112, rockably fitting to the support shaft 125 an arm 128 having at the opposite ends thereof rotatable rollers 127 engaging the guide surface 121, and rockably fitting to the support shaft 126 an arm 130 having at the opposite ends thereof rotatable rollers 129 engaging the guide surface 122.

The distance between the center of the support shaft 125 and the center of the support shaft 126, minus the distance in free condition from the center of the support shaft 125 to the common tangent of the two rollers 127 at that side on which the rollers 127 contact the guide surface 121 and the distance in free condition from the center of the support shaft 126 to the common tangent of the two rollers 129 at that side on which the rollers 129 contact the guide surface 122, is chosen to a value smaller than the width dimension between the guide surfaces 121 and 122 of the rail 123 and therefore, the rail 123 is assembled between the rollers 127 and 129 by resiliently deforming the arms 128 and 130 and enlarging the the spacing between the opposed rollers 127 and 129. Thus, the rollers 127 and 129 are always engaged with the guide surfaces 121 and 122 in pre-pressed or pre-loaded condition by the resilient deformation of the arms 128 and 130.

The arms 128 and 130 are provided with a cut-away 131 or 132 for causing the rollers 127 and 129 to engage the guide surfaces 121 and 122 with a suitable pre-loaded, but such cut-away may be replaced by any other means capable of providing suitable resiliency.

The second connecting portion is constituted by securing a key 135 having guide surfaces 133 and 134 in parallelism to the axis of the feed screw 112 by means of bolts 136, securing to the underside of the nut 120 support shafts 137 and 138 corresponding to the guide surfaces 133 and 134 respectively and spaced apart in a direction orthogonal to the axis of the feed screw 112, rockably fitting to the support shaft 137 an arm 140 having at the opposite ends thereof rotatable rollers 139 engaging the guide surface 133, and rockably fitting to the support shaft 138 an arm 142 having at the opposite ends thereof rotatable rollers 141 engaging the guide surface 134.

The distance between the center of the support shaft 137 and the center of the support shaft 138, minus the distance in free condition from the center of the support shaft 137 to the common tangent of the two rollers 129 at that side on which the rollers 139 contact the guide surface 133 and the distance in free condition from the center of the support shaft 138 to the common tangent of the two rollers 141 at that side on which the rollers 141 contact the guide surface 134, is similar to that in the first connecting portion. Thus, the rollers 139 and 141 are always engaged with the guide surfaces 133 and 134 in pre-loaded condition by the resilient deformation of the arms 140 and 142.

The arms 140 and 142 are provided with a cut-away 143 or 144 for providing suitable resiliency for the arms 140 and 142.

A motor 145 for driving the lower table 1 is shown only at a portion thereof secured to the base 2.

In the XY moving carriage of the present invention constructed as described above, the motor 119 for driving the upper table 107 is secured to the base 2 and thereof, a mechanism for driving the upper table 107 need not be provided on the lower table 1, and the inertia of the lower table 1 does not become great and therefore, a higher speed of operation of the lower table 1 can be provided and also, since the motor 119 is supported by the base 2, it rarely happens that vibration of the motor causes vibration of the table and much time is required for the table to become stable.

Also, the first connecting portion having a degree of freedom in the direction orthogonal to the axis of the feed screw 112 is provided between the nut 120 and the upper table 107, and the second connecting portion having a degree of freedom in the direction parallel to the axis of the feed screw 112 is provided between the nut 120 and the base 2, and the engagement of these connecting portions is effected by pre-pressed or pre-loaded rollers and therefore, even if there is some deviation of the nut, the positioning accuracy of the table is rarely hampered and thus, there is provided an XY moving carriage which can accomplish accurate positioning.

Further, the rollers engaging the guide surfaces of the connecting portions are provided at the opposite ends of the arm and this leads to great rigidity of the engaging portion and also, the resilient deformation with the arm as the center beam is utilized as the pre-pressure force imparted to the rollers and therefore, the spring constant can be made small and the fluctuation of the pre-pressure force resulting from the error of finishing during the manufacture is small, and this leads to the effect that uniform products can be manufactured easily.

This embodiment has been shown as having the first connecting portion in which the guide surfaces 121 and 122 are provided on the upper table 107 side and the support shafts 125 and 126 are provided on the nut 120 side, and the second connecting portion in which the guide surfaces 133 and 134 are provided on the base 2 side and the support shafts 137 and 138 are provided on the nut 120 side, but alternatively, the first connecting portion may be made into a construction in which the support shafts 125 and 126 are provided on the upper table 107 side and the guide surfaces 121 and 122 are provided on the nut 120 side, and the second connecting portion may be made into a construction in which the support shafts 137 and 138 are provided on the base 2 side and the guide surfaces 133 and 134 are provided on the nut 120 side, whereby there may be obtained a similar operational effect.

I claim:

1. A moving table assembly having a table supported for movement in one direction, a feed screw having its axis parallel to the direction of movement of said table, a nut threadably engaged with said feed screw, and a connecting mechanism for connecting said table and said nut, said connecting mechanism comprising a first connecting portion for transmitting the axial displacement of said nut to said table and a second connecting portion for preventing said nut from rotating relative to the axis of said feed screw, said first connecting portion being provided with a guide member having a pair of guide surfaces provided on one of said table and said nut in orthogonal relationship with the axis of said feed screw, two support shafts corresponding to said guide surfaces respectively and secured to the other of said table and said nut, and two arms rockably provided on said support shafts respectively and having at the opposite ends thereof rotatable rollers engaging said guide surfaces, said rollers being pre-loaded against said guide surfaces by resilient deformation of said arms.

2. A moving table assembly according to claim 1, further having a pin secured to one of said table and said nut in spaced apart relationship with said first connecting portion, an engaging surface engaged with said pin and provided on the other of said table and said nut, said engaging surface being parallel to the axis of said feed screw, and biasing means provided in opposed relationship with said engaging surface, said pin being pre-loaded against said engaging surface by said biasing means.

3. A moving table assembly according to claim 1 or 2, wherein one of said arms is provided with a cut-away.

4. A moving table assembly provided with a lower table supported by a base for movement in one direction, an upper table supported by said lower table for movement in a direction perpendicular to the direction of movement of said lower table, a feed screw rotatably supported on said base in parallelism to the direction of movement of said upper table, a nut threadably engaged with said feed screw, a first connecting portion provided between said nut and said upper table, and a second connecting portion provided between said nut and said base to prevent said nut from rotating relative to said feed screw, said first connecting portion being provided with a pair of guide surfaces provided on one of said nut and said upper table in orthogonal relationship with the axis of said feed screw, and two arms rockably fitted to two support shafts corresponding to said guide surfaces and secured to the other of said nut and said upper table in spaced apart relationship in the axial direction of said feed screw, said arms having at the opposite ends thereof rotatable rollers engaging said guide surfaces, said rollers being pre-loaded against said guide surfaces by resilient deformation of said arms.

5. A moving table assembly according to claim 4, wherein said second connecting portion is provided with a pair of guide surfaces provided on the other of said nut and said base in parallelism with the axis of said feed screw, and two arms rockably fitted to support shafts corresponding to said guide surfaces and secured to the other of said nut and said base in spaced apart relationship in a direction orthogonal to the axis of said feed screw, said arms having at the opposite ends thereof rotatable rollers engaging said guide surfaces, said rollers being pre-loaded against said guide surfaces by resilient deformation of said arms.

* * * * *